(12) United States Patent
Khaled et al.

(10) Patent No.: US 8,613,847 B2
(45) Date of Patent: Dec. 24, 2013

(54) METHOD OF APPLYING POLYELECTROLYTE MULTILAYER FILM FOR CORROSION CONTROL

(75) Inventors: Mazen M. Khaled, Dhahran (SA); Basel F. Abu-Sharkh, Dhahran (SA); Abdalla Manda, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 943 days.

(21) Appl. No.: 12/292,466

(22) Filed: Nov. 19, 2008

(65) Prior Publication Data

US 2010/0124666 A1 May 20, 2010

(51) Int. Cl.
*B05D 1/36* (2006.01)
*C25D 5/36* (2006.01)

(52) U.S. Cl.
USPC .......... 205/217; 205/219; 427/327; 427/402; 427/409; 427/421.1; 427/427.5

(58) Field of Classification Search
USPC ................................................. 205/219, 217
See application file for complete search history.

(56) References Cited

U.S. PATENT DOCUMENTS

| | | | |
|---|---|---|---|
| 3,658,710 A | 4/1972 | Puckorius | |
| 4,178,194 A * | 12/1979 | Azzerri et al. | 148/111 |
| 4,437,905 A * | 3/1984 | Nitto et al. | 148/623 |
| 4,437,944 A * | 3/1984 | Bruno et al. | 205/118 |
| 4,520,043 A | 5/1985 | Davidian | |
| 4,613,450 A | 9/1986 | Moran et al. | |
| 4,724,125 A | 2/1988 | Tsuneki et al. | |
| 4,836,768 A | 6/1989 | Wilson et al. | |
| 6,818,118 B2 | 11/2004 | Kotov et al. | |
| 2003/0027011 A1 | 2/2003 | Kotov et al. | |
| 2004/0265603 A1 | 12/2004 | Schlenoff | |
| 2005/0023506 A1 | 2/2005 | Someyu et al. | |
| 2006/0037861 A1 | 2/2006 | Manos et al. | |

FOREIGN PATENT DOCUMENTS

EP 65609 12/1982
WO WO 03/014234 2/2003

OTHER PUBLICATIONS

F. A. Lowenheim, Electroplating, McGraw-Hill Book Co., New York, 1978, pp. 86-87.*
A. D. Merriman, A Dictionary of Metallurgy, MacDonald & Evans, Ltd., London, 1958, pp. 29, 189, 339-340.*
F. A. Lowenheim, Electroplating, McGraw-Hill Book Company, New York, 1978, pp. 86-87.*

* cited by examiner

*Primary Examiner* — Patrick Ryan
*Assistant Examiner* — William Leader
(74) *Attorney, Agent, or Firm* — Richard C Litman

(57) ABSTRACT

The method of applying a polyelectrolyte multilayer film for corrosion control involves chemical and/or electrochemical pretreatment of a metallic substrate for better adherence of the protective film to the substrate. The method includes anodically polarizing the substrate in a solution of an acid for a period from one second to five hundred seconds before multilayer deposition. The acid may be an inorganic acid, such as sulfuric acid, phosphoric acid, hydrochloric acid, nitric acid, etc., or an organic acid, such as oxalic acid, acetic acid, etc. The method may include abrading the substrate and rinsing the substrate with deionized water before polarizing the substrate, and applying the polyelectrolyte multilayers following pretreatment.

10 Claims, 1 Drawing Sheet

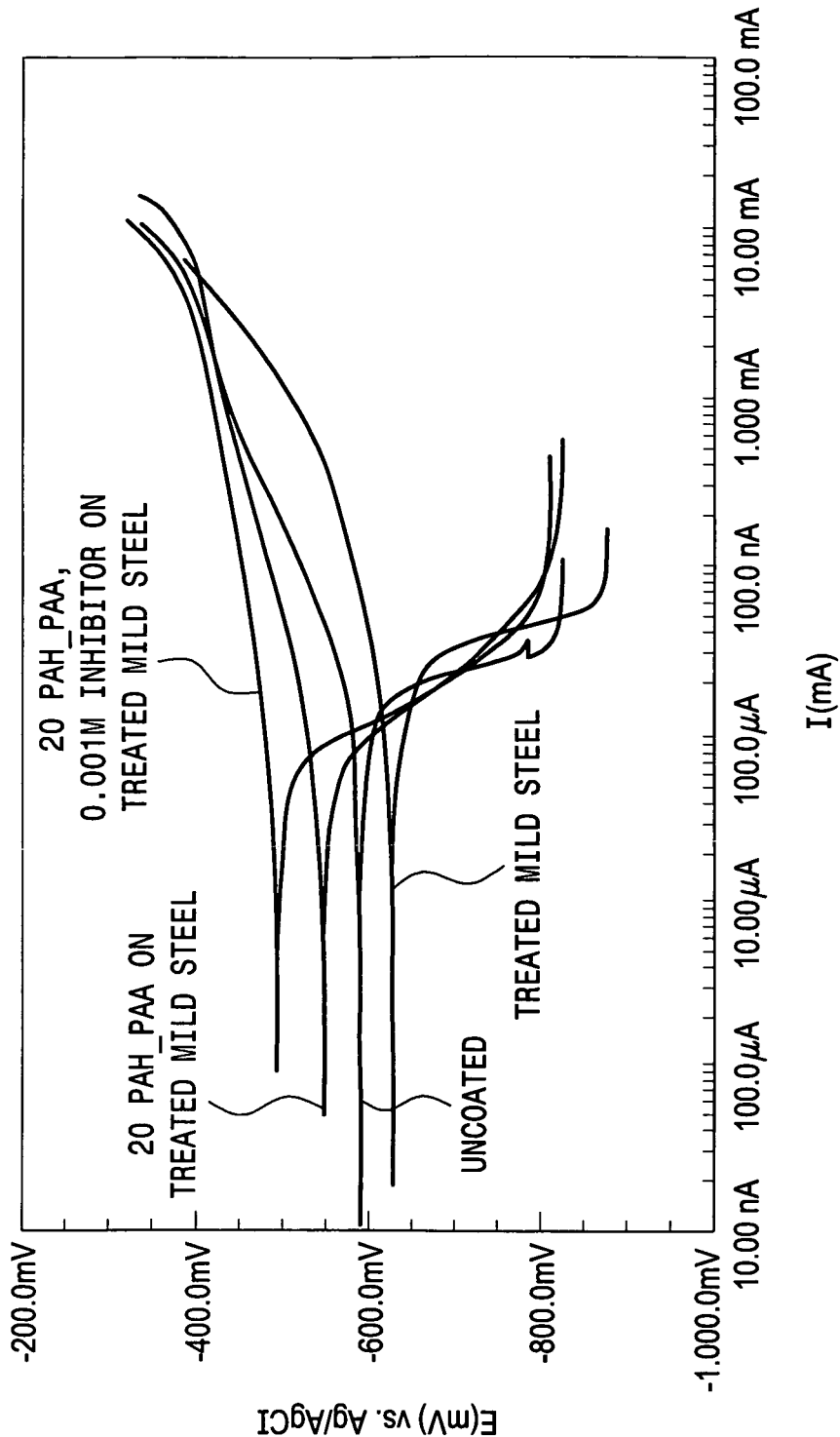

US 8,613,847 B2

METHOD OF APPLYING POLYELECTROLYTE MULTILAYER FILM FOR CORROSION CONTROL

BACKGROUND OF THE INVENTION

1. Field of the Invention

The present invention relates to compositions and methods for protecting metallic substrates from corrosion, and particularly to a method of applying a polyelectrolyte multilayer film for corrosion control, and to metallic substrates having a polyelectrolyte multilayer film applied according to the method.

2. Description of the Related Art

Metal components are often used in environments in which the components are subject to corrosion from exposure to the environment, harsh chemicals, etc. A variety of coatings have been developed for protecting metals from corrosion.

One such coating that has been developed in recent years is a polyelectrolyte multilayer (PEMU) film coating, as described in U.S. Patent Publication No. 2004/0265603 (the '603 publication), published Dec. 30, 2004 on behalf of inventor J. B. Schlenoff, which is hereby incorporated by reference in its entirety. The '603 publication describes the application of PEMU films to a stainless steel substrate. While application to such a substrate is effective, nevertheless, a problem arises in attempting to apply a PEMU film to other metallic substrates, such as mild or carbon steel substrates. The PEMU oxidize the mild or carbon steel substrates and lead to reddish, non-adherent films upon immersing the substrate in polyelectrolyte solutions for application of the coating.

None of the above inventions and patents, taken either singly or in combination, is seen to describe the instant invention as claimed. Thus, a method of applying a polyelectrolyte multilayer film for corrosion control solving the aforementioned problems is desired.

SUMMARY OF THE INVENTION

The method of applying a polyelectrolyte multilayer film for corrosion control involves chemical and/or electrochemical pretreatment of a metallic substrate for better adherence of the protective film to the substrate. The method includes anodically polarizing the substrate in a solution of an acid for a period from one second to five hundred seconds before multilayer deposition. The acid may be an inorganic acid, such as sulfuric acid, phosphoric acid, hydrochloric acid, nitric acid, etc., or an organic acid, such as oxalic acid, acetic acid, etc. The method may include abrading the substrate and rinsing the substrate with deionized water before polarizing the substrate, and applying the polyelectrolyte multilayers following pretreatment.

These and other features of the present invention will become readily apparent upon further review of the following specification and drawing.

BRIEF DESCRIPTION OF THE DRAWINGS

The sole FIGURE is a chart showing Tafel plots comparing samples of mild steel having polyelectrolyte films applied according to the method of the present invention with untreated mild steel.

DETAILED DESCRIPTION OF THE PREFERRED EMBODIMENTS

The present invention relates to a method of applying a polyelectrolyte multilayer film for corrosion control involves chemical and/or electrochemical pretreatment of a metallic substrate for better adherence of the protective film to the substrate. The method includes anodically polarizing the substrate within the Tafel region (e.g., between 0 and 200 mV vs. open circuit potential) in a solution of an acid for a period from one second to five hundred seconds before multilayer deposition. The acid may be an inorganic acid, such as sulfuric acid, phosphoric acid, hydrochloric acid, nitric acid, etc., or an organic acid, such as oxalic acid, acetic acid, etc. The concentration of the acid is between 1 mM and 0.1 M. The method may include abrading the substrate and rinsing the substrate with deionized water before polarizing the substrate, and applying the polyelectrolyte multilayers following pretreatment.

The materials that may be protected by this invention are low quality steel, such as mild steel, carbon steel, etc.

The oppositely charged polymers (i.e., polyelectrolytes) used to form the biocidic coating are water and/or organic soluble, or dispersed in water and/or organic solvent, and comprise monomer units that are positively or negatively charged. Polyelectrolytes are defined as macromolecules bearing a plurality of charged units arranged in a spatially regular or irregular manner. Polyelectrolytes may be synthetic (synthetic polyelectrolytes), naturally occurring (such as proteins, enzymes, polynucleic acids), or synthetically modified naturally occurring macromolecules (such as modified celluloses and lignins). The polyelectrolytes used in the present invention may be copolymers that have a combination of charged and/or neutral monomers (e.g., positive and neutral; negative and neutral; positive and negative; or positive, negative and neutral). Copolymers are defined as macromolecules having a combination of two or more repeat units. Regardless of the exact combination of charged and neutral monomers, a polyelectrolyte of the present invention is predominantly positively-charged or predominantly-negatively charged, and hereinafter is referred to as a "positively-charged polyelectrolyte" or a "negatively-charged polyelectrolyte," respectively.

The molecular weight of synthetic polyelectrolyte molecules is typically about 100 to about 10,000,000 grams/mole, and preferably about to about 1,000,000 grams/mole. The molecular weight of naturally occurring polyelectrolyte molecules (e.g., biomolecules), however, can reach as high as 10,000,000 grams/mole. The polyelectrolyte typically comprises about 0.01% to about 40% by weight of a polyelectrolyte solution, and preferably about 0.1% to about 10% by weight.

Examples of a negatively-charged polyelectrolyte include polyelectrolytes comprising a sulfonate group ($SO_3^{-2}$), such as poly(styrenesulfonic acid)("PSS"), poly(2-acrylamido-2-methyl-1-propane sulfonic acid)("PAMPS"), sulfonated poly (ether ether ketone) (SPEEK), sulfonated lignin, poly(ethylenesulfonic acid), poly(methacryloxyethylsulfonic acid), their salts, and copolymers thereof; and polycarboxylates, such as poly(acrylic acid)("PAA") and poly(methacrylic acid) and polyphosphonic acids.

Examples of a positively-charged polyelectrolyte include poly-electrolytes comprising a quaternary ammonium group, such as poly(diallyidimethylammonium chloride)("PDAD"), poly(vinylbenzyltrimethyl-ammonium)("PVBTA"), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group, such as poly(N-methylvinylpyridine) ("PMVP"), other poly(N-alkylvinylpyridines), and copolymers thereof; and protonated polyamines, such as poly(allylaminehydrochloride) ("PAH") and polyethyleneimmine ("PEI").

A polyelectrolyte solution comprises a solvent in which the selected polyelectrolyte is soluble. The solvent can be water or some other organic or inorganic solvent. For example, poly(vinyl pyridine) alkylated with a methyl group ("PNM4VP") is water soluble, whereas poly(vinyl pyridine) alkylated with an octyl group ("PNO4VP") is organic solvent soluble. Examples of poly-electrolytes used in accordance with this invention that are soluble in water, include poly (styrenesulfonic acid), poly(2-acrylamido-2-methyl-1-propane sulfonic acid), poly(acrylic acids), sulfonated lignin, poly(ethylenesulfonic acid), poly(methacryloxyethylsulfonic acid), poly(methacrylic acids) their salts, and copolymers thereof; as well as poly(diallyidimethylammon-ium chloride), poly(vinylbenzyltrimethylammonium), ionenes, poly(acryl-oxyethyltrimethyl ammonium chloride), poly (methacryloxy(2-hydroxy)propyltrimethyl ammonium chloride), and copolymers thereof; and polyelectrolytes comprising a pyridinium group, such as poly(N-methylvinylpyridine), and protonated polyamines, such as poly(allylamine hydrochloride) and poly(ethyleneimmine). Examples of polyelectrolytes that are soluble in non-aqueous solvents, such as methanol, ethanol, dimethylformamide, acetonitrile, carbon tetrachloride, and methylene chloride, include poly(N-alkylvinylpyridines), and copolymers thereof where the alkyl group is longer than about 4 carbons. Other examples of poly-electrolytes soluble in organic solvents include poly(styrenesulfonic acid), polysulfonated ethyl ether ketone (SPEEK), sulfonated polyfluoroethylene, poly (2-acrylamido-2-methyl-1-propane sulfonic acid), poly(diallyl-dimethylammonium chloride), poly(N-methylvinylpyridine) and poly(ethyl-eneimmine) where the small polymer counterion, for example, $Na^+$, $Cl^-$, or $H^+$, has been replaced by a large hydrophobic counterion, such as tetrabutyl ammonium, tetrathethyl ammonium, iodine, hexafluorophosphate, tetrafluoroborate, or trifluoromethane sulfonate.

The polyelectrolyte solutions may comprise one or more "salts." A "salt" is defined as a soluble, ionic, inorganic compound that dissociates to stable ions (e.g., sodium chloride). A salt is included in the polyelectrolyte solutions can be used to control the thickness of the adsorbed layers. More specifically, including a salt increases the thickness of the adsorbed polyelectrolyte layer. The amount of salt added to the polyelectrolyte solution is typically around 10% by weight or less.

Polyelectrolyte solutions and/or a polyelectrolyte complex solution or polyelectrolyte dispersions may be deposited on the substrate by any appropriate method, such as casting, dip coating, doctor blading, soaking, sedimenting and/or spraying. Particularly preferred are dip coating and spraying. Spraying is especially preferred when applying the coating using alternating exposure of oppositely charged polyelectrolyte solutions or a single coat composed of one polyelectrolyte or a mixture of the polyelectrolytes.

The duration in which a polyelectrolyte solution is typically in contact with the surface it is sprayed upon (i.e., the contact time) can vary from a few seconds to several minutes to achieve optimum thickness. Generally, a contact time of about 10 seconds provides a satisfactory thickness, especially if sufficient agitation is provided.

The oppositely-charged polyelectrolyte solutions can be sprayed immediately after each other or after intermediate rinsing with an appropriate solvent. In addition, a drying step may be applied between depositions.

A variety of additives can be incorporated into a film as it is formed. Additives that may be incorporated into polyelectrolyte multilayers include inorganic materials, such as metallic oxide particles (e.g., silicon dioxide, aluminum oxide, titanium dioxide, iron oxide, zirconium oxide and vanadium oxide) or metals or organic and/or inorganic biocides, or compounds with antibacterial and anticorrosion properties. For example, nanoparticles of zinc, zinc oxide or zirconium oxide may be added to a polyelectrolyte solution/polyelectrolyte complex solution to improve the abrasion resistance of a deposited film. Alternatively, one of the polyelectrolytes may be omitted completely and substituted by a particle, or a nanoparticle, for example, a colloidal oxide, bearing a surface charge. Usually the surface charge is negative, and the particle therefore substitutes the negative polyelectrolyte. These particles are of diameter 1 nm-1000 nm and preferably in the range 5 nm-100 nm.

EXAMPLE

Steel wires (1.35 mm diameter), type mild steel, were abraded with emery polishing paper, and then washed with deionized water. Some of the abraded wires were treated electrochemically and/or chemically and then coated by spin coating with alternating oppositely charged polyelectrolyte solutions. The electrochemical treatment included polarizing the steel wire anodically in a solution containing one or more of the following acids: sulfuric acid, phosphoric acid, oxalic acid, or other inorganic or organic acids for a period from 1s to 500s before multilayer deposition. One particular coating was made with 0.1% cationic polyelectrolyte poly(allylaminehydrochloride) (PAH) and the anionic polyelectrolyte poly(acrylic acid) (PAA).

The uncoated/coated wires were placed in an electrochemical cell to test the electrochemical properties of the polyelectrolyte films to ensure that the film adheres and affects the surface properties of the 316 stainless steel. The electrochemical cell was run at room temperature. The electrolyte was 0.7M NaCl. The area of the wire dipped in the electrolyte was in the proximity of 0.6 cm². The anodic polarization curves were recorded using a Gamry potentiostat. The reference electrode was a Ag/AgCl, against which all potentials are based.

The steel wires were scanned within 200 mV from the open circuit potential. Tafel scans of uncoated mild steel wire, mild steel wire treated with one or more acids, mild steel wire coated pretreated by anodic polarization in acid as described above and coated with 20 multilayers of PAH-PAA, and mild steel wire pretreated by anodic polarization in acid as described above and coated with 20 multilayers of PAH-PAA incorporating 0.001M corrosion inhibitor are shown in the sole drawing FIGURE. The scans were performed in 0.7M NaCl at a scan rate of 0.166 mV/s.

Electrochemical corrosion parameters (including $E_{corr}$, $I_{corr}$, $\beta a$, $\beta c$, and Corrosion Rate [CR]) derived from the Tafel plots are summarized in the following table.

TABLE

Electrochemical Corrosion Parameters

| | Parameter | | | | |
|---|---|---|---|---|---|
| Sample | βa V/decade | βc V/decade | $I_{corr}$ (μA) | $E_{corr}$ (mV) | CR (mpy) |
| Uncoated steel | 0.101 | 3.68 | 25.5 | −592 | 17.4 |
| Treated mild steel | 0.0805 | 0.914 | 29.7 | −632 | 19.4 |
| 20 PAH-PAA on treated mild steel | 0.0519 | 0.253 | 6.03 | −548 | 3.9 |

TABLE-continued

| | Electrochemical Corrosion Parameters | | | | |
|---|---|---|---|---|---|
| | Parameter | | | | |
| Sample | $\beta a$ V/decade | $\beta c$ V/decade | $I_{corr}$ (μA) | $E_{corr}$ (mV) | CR (mpy) |
| 20 PAH-PAA, 0.001 M benzotriazole on treated mild steel | 0.0337 | 0.327 | 5.4 | −496 | 3.53 |

It is noted from the drawing FIGURE and the corrosion parameters summarized in the Table that the treated and then coated steel samples exhibit a higher anodic corrosion potential and much lower corrosion rate. The corrosion rate decreased from 17.4 mpy to 3.9 mpy. The corrosion rate decreased further to 3.53 mpy upon incorporating the corrosion inhibitor benzotriazole in the multilayer film structure.

Surface treatment is necessary before deposition of the multilayers by the present method. Incorporating a corrosion inhibitor further enhances the corrosion control by the polyelectrolyte multilayer film. It is to be understood that the present invention is not limited to the embodiments described above, but encompasses any and all embodiments within the scope of the following claims.

We claim:

1. A method of applying a polyelectrolyte multilayer film for corrosion control of mild steel, consisting of the steps of:
    abrading a mild steel substrate;
    rinsing the mild steel substrate with deionized water;
    anodically polarizing the mild steel substrate in a solution of an acid having a concentration between approximately 1 mM and approximately 0.1 M for a period from one second to five hundred seconds, wherein the difference of potential imposed on the substrate is less than 200 mV; and
    thereafter, depositing multiple layers of oppositely charged polyelectrolytes on the mild steel substrate by alternately exposing the mild steel substrate to solutions of oppositely charged polyelectrolytes.

2. The method of applying a polyelectrolyte multilayer film according to claim 1, wherein the acid comprises an inorganic acid.

3. The method of applying a polyelectrolyte multilayer film according to claim 1, wherein the acid comprises an inorganic acid selected from the group consisting of sulfuric acid, phosphoric acid, hydrochloric acid, and nitric acid.

4. The method of applying a polyelectrolyte multilayer film according to claim 1, wherein the acid comprises an organic acid.

5. The method of applying a polyelectrolyte multilayer film according to claim 1, wherein the acid comprises an organic acid selected from the group consisting of oxalic acid and acetic acid.

6. The method of applying a polyelectrolyte multilayer film according to claim 1, wherein said oppositely charged polyelectrolytes comprise positively charged polyelectrolytes containing an ammonium, a pyridinium, or an amine functional group.

7. The method of applying a polyelectrolyte multilayer film according to claim 6, wherein said oppositely charged polyelectrolytes comprise negatively charged polyelectrolytes containing a sulfonate, an acrylic acid, or a deprotonated carboxylate functional group.

8. The method of applying a polyelectrolyte multilayer film according to claim 1, wherein said oppositely charged polyelectrolytes comprise poly(allylaminehydrochloride) (PAH) and poly(acrylic acid) (PAA).

9. The method of applying a polyelectrolyte multilayer film according to claim 1, wherein said multiple layers of oppositely charged polyelectrolytes include a corrosion inhibitor admixed therewith.

10. The method of applying a polyelectrolyte multilayer film according to claim 1, wherein said multiple layers of oppositely charged polyelectrolytes include a metallic oxide particle admixed therewith, the metallic oxide particle being a particle being selected from the group consisting of silicon dioxide, aluminum oxide, titanium dioxide, iron oxide, zirconium oxide, zinc oxide, and vanadium oxide.

* * * * *